United States Patent Office
3,840,677
Patented Oct. 8, 1974

3,840,677
BACON-LIKE MEAT ANALOGS
Harold T. Leidy, New City, and John T. Hayes, Jr., North Tarrytown, N.Y., and Atta M. Hai, Los Angeles, Calif., assignors to General Foods Corporation, White Plains, N.Y.
No Drawing. Filed Mar. 22, 1972, Ser. No. 236,982
Int. Cl. A23l 1/27, 1/100; A23j 3/00
U.S. Cl. 426—94                                   8 Claims

ABSTRACT OF THE DISCLOSURE

Simulated multi-phased meat-like products containing vegetable protein, albumen, fat, and water are prepared from uncolored and colored emulsions which are layered into a loaf to produce distinctly colored regions. The loaf is coagulated with heat, and sliced into strips which when fried visually and texturally resemble fried meat, particularly bacon.

BACKGROUND OF THE INVENTION

This invention relates to meat like products having distinct lean and fatty appearing regions and the method of preparing them, and more particularly to a simulated bacon product having a fried appearance and texture resembling fried bacon.

In the past decade, research and devolopment efforts have been undertaken to produce meat—or protein-containing foods from vegetable and animal protein sources. Economics provided an incentive in the attempt to substitute the more efficient process of growing vegetable proteins for the rather inefficient process in which animals convert proteinaceous vegetable materials into meat. Another factor contributing to prior work was the ever-increasing human population which was feared to be outdistancing the ability to provide grazing land for meat-producing animals. Recent efforts have been also directed to avoiding certain natural products, such as saturated fat and cholesterol which are of concern to people who must be on special diets for health reasons; or for many people who refuse to eat meat or meat by-products for religious reasons. The main shortcoming of the prior art efforts has been the failure to produce synthetic products that truly have a texture, appearance, and flavor similar or equivalent to the natural product. An early patent to DeVoss, et al., U.S. Pat. No. 2,495,706, teaches formation of a vegetable gel from the proteinaceous content of soybeans. Other early efforts were the Boyer patents, U.S. No. 2,682,466, No. 2,730,447, and No. 2,730,448, drawn to prepare spun protein for use in synthesizing vegetable protein fibers resembling natural meat. Later contributions were made by Anson, U.S. Pats. No. 2,802,737 and No. 2,830,902, who developed a vegetable protein product prepared from a non-uniform mixture of meat-like protein gel having therein a minor amount of kneaded dough. The Anson products were intended for preparing luncheon slices as a nutritious substitute for the meat-based luncheon slices on the market. Further developments by Anson are exemplified by the following U.S. Pats. No. 2,813,024, No. 2,813,025, No. 2,833,651, and No. 2,879,163, which are generally drawn to producing meat products resembling meat spreads, or drawn to the use of protein filaments to synthesize meat. A further attempt at making luncheon meats and the like is characterized by Durst, U.S. Pat. No. 3,108,873, who makes luncheon loaves by forming a gel-like dispersion containing an external phase formed from edible hydrophilic film-former, and a discontinuous internal phase formed from an edible lipophilic fluid. Durst teaches that excess water prior to initial mixing has a detrimental effect on the ultimate emulsion.

Several attempts by the inventors of the current assignee are Rusoff, U.S. Pat. No. 3,047,395, who made meat fibers by heat treatment of vegetable or meat protein slurries; and MacAllister, U.S. Pat. No. 3,102,031, who prepared hamburger-like granules from vegetable protein. A recent patent to Hartman, U.S. No. 3,320,070, is directed to preparing a bacon analog employing acid coagulated protein fibers bound together in a vegetable protein matrix.

Other U.S. patents of interest are: Circle, No. 2,881,155; Sair. No. 3,440,054; Andregg, No. 2,776,212; Dudman, No. 2,785,069; Sair, No. 2,881,076; Tobin, No. 3,000,743; Westeen, No. 3,118,959; Ziegenfuss, No. 3,124,466; Elmquist, No. 3,175,909; Kuromoto, No. 3,177,079; Hartman, No. 3,290,152; Johnsen, No. 3,308,113; Kjelson, No. 3,343,963; Boushka, No. 3,416,929; Hawley, No. 3,469,991 and Page, No. 3,498,793.

Since consumer acceptance of meat-like products formulated from non-meat high-protein materials is in large measure predicted upon the extent of appearance, texture, taste, and chewiness duplication of natural meat products, considerable difficulty is occasioned by proceeding from vegetable or animal-derived protein sources to a final meat-like food product. This is particularly true for bacon where large external differences are present between the lean and fatty portions of the bacon. Prior art techniques have heavily relied on spun protein fibers prepared by acid coagulating a soluble vegetable protein. These fibers are then grouped together, stretched, and cut into various lengths, and generally bound together with a binder to prepare the desired final meat product. It is apparent in reading the Hartman patent that the use of spun fibers in his bacon analog is essential, as is the use of a higher percentage of albumen in the colored region, to the development of textural characteristics in his product which is currently sold as "Sipples."

SUMMARY OF THE INVENTION

The general purpose of this invention is to provide a meat-like product from water, fats, vegetable protein and animal-derived protein such as albumen. This invention is primarily directed to a product having lean and fatty phases intended to simulate meat products. When fried, the product of this invention has a fatty phase which has a mouthfeel similar to the fatty portion of bacon. The product has a meat-like, or lean phase, simulating the texture of the fried meat portion of bacon. The bacon analog of this invention is designed to crinkle on frying, further resembling in appearance a fried, natural bacon.

The product of this invention is prepared by forming specific red and neutral colored mixtures of water, fat, heat-coagulable vegetable protein, and/or heat-coagulable animal-derived proteins such as albumen. In addition, non-coagulable proteinaceous fillers, flavors, and colors are employed. Control of the proportions of ingredients employed in each phase provides the desired fried texture and crinkle. Control of the pH, viscosity, and density of the phases allows layering of the distinctly colored phase into a loaf to provide on slicing a variety of physical appearances and further develops the textural characteristics of the product. The loaf is then heat coagulated and sliced, producing slices having distinct fat and lean phases, and which when fried produce a bacon analog which has the appearance and textural characteristics of fried bacon.

DESCRIPTION OF THE INVENTION

The meat analog of this invention is prepared by preparing differently colored emulsions of fat, water, and heat-coagulable protein: and having incorporated therein one or more protein fillers, colors, flavors, and the like. The density, pH, and viscosity of the emulsions is controlled so that when the emulsions are combined and heat set, they will form a continuous loaf which when sliced has distinct phases, which when fried resemble the lean and fatty portions of fried meat. Each emulsion is prepared from ingredients selected to form uniform suspensions without large particles of materials visually apparent to the eye. Thus, all ingredients are either liquid; or where solid are ground or otherwise treated to reduce particle size such that large particles of fat, proteinaceous filler, and the like are not apparent in the final coagulated and layered product.

The white or fatty phase of the meat analog is prepared from fat, water, and albumen which may further contain a vegetable protein isolate, proteinaceous filler, flavors, colors and the like. The following table gives the proportions of materials necessary to produce a final fried product having a white phase which can be characterized as melting in your mouth and closely resembling the texture and flavor of the fried fatty part of bacon.

TABLE I.—FATTY PHASE
[Dry basis]

| Ingredients | Percent of ingredients | Preferred percent of ingredients for bacon |
|---|---|---|
| Water | 20 to 39 | 25–35 |
| Fat | 30 to 50 | 35–45 |
| Albumen | 7 to 20 | 9–18 |
| Protein isolate | 0 to 5 | 0–4 |
| Proteinaceous filler | 0 to 20 | 5–15 |
| Color and flavoring agents | To taste, usually 5 to 15. | 8–12 |

We have found preparation of a white phase having specific proportions of ingredients is important to develop the crinkling effect normally seen in fried, natural bacon. It is the white phase that apparently causes the crinkling characteristic of our product. While the white phase alone crinkles, the overall crinkling is also influenced by the fact that the red phase contracts and the white phase expands on cooking.

The composition of the white phase is critical to the textural characteristics apparent when the product is eaten. The fried white phase of this invention melts in one's mouth in a manner substantially the same as produced by the fried fat portion of natural bacon.

The white phase is composed of water, fat, albumen, and flavors, and may contain optional proteinaceous fillers. The fat is necessary to obtain the proper meltdown in the mouth on eating the fried product. Both the water content and fat content are suspected to cause, in combination with albumen, the crinkling effect on frying.

Albumen is used at a fairly high level, and is believed to act as both an emulsifier to form dispersions or emulsions which are stable for at least several hours, and to further provide an artificial matrix to support and contain the fat phase. In other words, the second effect of albumen might be considered to simulate the cellular tissues present in non-rendered fat, in that the albumen is believed to at least partially entrap the fat allowing one to prepare a solid food product capable of being fried without appreciable fat being given up, and yet capable on being eaten of causing the melting effect so typical of the fatty part of bacon.

In comparing the white phase to the red phase, we have found it critical that neither the proportion of water in each phase or the proportion of fat in each phase overlap in proportions. These two materials—water and fat—will always be present in the two phases in different proportions, and it is believed that this difference is critical to provide the necessary textural differences between the phases.

Furthermore, it appears important to control the weight of water and fat in each phase. The total weight of fat and water in one phase should proximate the total weight of the fat and water in the other phase.

Albumen has its effect on texture, and it is surprising to some degree that albumen should be maintained at a higher level in the white phase where a softer melting texture is desired, since albumen would be expected to cause a chewiness which would be more desirable in a red phase. The proportion of albumen appears to affect the degree of crinkling of the white phase, with higher proportions causing greater crinkling. It is preferable that the albumen content of the white phase be at least twice that of the red phase. We have found that too little albumen present in the white phase emulsion causes the emulsion to separate prior to forming a loaf or to oil-off during autoclaving of the loaf. It is, therefore, critical that the albumen content of the white phase be maintained at least about 8% by weight of the ingredients of the phase. We have also found that too high a level of albumen causes the white phase to become harder to work during mixing and extremely difficult to layer into a loaf. Furthermore, high albumen levels of above 19% by weight of the major ingredients of the white phase do not give the proper meltdown in the mouth when the fried product is eaten, and causes the white phase to become rubbery and tough.

In preparing the white emulsion prior to layering, it is important to control the density of the mixture. A useful density range is from 0.80 to 0.95 g./cc., preferably from 0.80 to 0.90 g./cc. We have found that as the ingredients are mixed, the density initially decreases, only later to increase. Mixing beyond the period of noticeable increase in density is not desirable. Density is a measure of the gas or air incorporated in the white phase, or equivalent to overrun figures many times given for whipped systems. The incorporation of gas in the white phase produces a lighter phase and seems to produce a better meltdown on eating the fried product.

The white phase is prepared by mixing proteinaceous fillers and the desired water in a simple batch mixer such as a Hobart for a period of time sufficient to wet the materials and produce a uniform mix. We have found in the laboratory that this time is normally about 10 minues. Spices, flavors, and albumen are next added and the resulting mixture blended again for about 10 minutes to obtain a uniform blend of ingredients. To this uniform blend is added fat and fat-dispersible flavors and the total mix is blended for a period of time sufficient to emulsify the fat to the point it will not separate for at least 2 or 3 hours. The white phase is then ready for layering.

In many cases it is preferable to add water in increments to develop an initial high viscosity which is not reduced appreciably on addition of the remaining water. Control of white phase viscosity produces a more uniform layering of red and white phases approaching the appearance of the stripes of the U.S. flag.

In the meat analog of this invention, the distinct textural phases, lean and fatty, are preferably colored to correspond to the texture designed into each phase. Thus the fatty phase is normally a neutral or whitish color and the lean phase a reddish color. However, this is not critical. It may be desirable, as with a bacon-like product, to color some of the fatty phases within the bacon slice red to simulate the lean phase. This provides a leaner looking product which is preferred by the consumer, while retaining a texture sumulating the fattier natural bacon products currently being marketed. However, the exact method of coloring the product is a matter of choice. If desired, the fatty texture phase could be colored to simulate lean meat and the lean textured phase left a neutral color to visually simulate fat. Alternately, both phases could be left uncolored and the product later colored by methods employed for printing solids such as stamping a bacon strip with the desired visually differing lean and fatty colors.

The red or lean phase of the meat analog is prepared from fat, water, color and flavors, and a mixture of protein isolate and albumen, which may further contain proteinaceous fillers. The following table gives the proportions of materials necessary to produce a final fried product having a red phase, with a fibrous chewness resembling the texture and flavor of the fried, lean part of bacon.

TABLE II.—LEAN PHASE
[Dry basis]

| Ingredients | Percent of ingredients | Preferred percent of ingredients for bacon |
|---|---|---|
| Water | 40 to 65 | 45-60 |
| Fat | 10 to 25 | 15-25 |
| Protein isolate | 6 to 24 | 9-18 |
| Albumen | Up to 15 | 1-8 |
| Proteinaceous filler | 0 to 15 | 1-10 |
| Color and flavoring agents | To taste, usually 5 to 15 | 5-10 |
| Thickening agent | 0 to 2 | 0-1 |

The red phase of our invention is intended to simulate the lean or meat portion of natural bacon. Its texture on frying is designed to produce a lean, meat-like texture and not to have the soft, melting properties of the white phase.

To produce a gel simulating lean meat, we have found it preferable to combine a vegetable protein isolate and albumen which, together with fat and without the need for fillers such as spun protein fibers or texturized vegetable protein, is sufficient to simulate, after frying, the lean portion of bacon. The red phase is composed of a major amount of water as a primary ingredient, with the remainder being primarily fat and the combined protein consisting of vegetable protein isolate, generally soy isolates and albumen.

While the proteinaceous filler may be employed in addition to the other major ingredients, it is surprising that less filler is desirable in the red than in the white phase. The filler is believed to act simply as a filler and not to contribute appreciable texture to the red phase. This differs significantly from the prior art wherein spun vegetable fibers are found necessary to produce the meat-like character of the lean phase of bacon, notably the technique employed by Hartman for producing the commercial product "Stripples." If the proteinaceous filler has any effect on texture, it is believed to disrupt the protein isolate-albumen phase and render it discontinuous. The proportions of the red phase are designed, on frying, to produce a dehydrated phase having the mouthfeel similar to fried meat. A large amount of water is removed during frying to produce the fried meat texture.

The red phase is prepared by employing a suitable vegetable protein isolate, either as a frozen curd, freshly made or in dried form. The protein isolate, typically soy isolated at its isoelectric point, is adjusted to a pH of between 6.0 to 6.4, and is treated to produce a final solids content of 30% isolate. The aqueous isolate mixture is then blended with filler, where employed, for about 10 minutes to form a uniform mixture. Spices, flavors, color and albumen are then added to the mixture and again blended for about 10 minutes until a uniform mixture is obtained. To that mixture is added fat and fat-soluble flavors, and the entire mixture blended for about 15 minutes to produce an emulsion stable for at least several hours. It is during this emulsification that a useful density ranging from 0.85 to 1.05, preferably 0.91 to 0.99 is obtained. The red phase is now ready for layering.

As a preferred embodiment of our invention, part of the red phase is isolated and further colors added producing a second red colored phase which will be layered in the same manner as the initial red phase to produce a layered product having at least two distinctly colored red layers which more typically resembles natural, fried bacon.

The physical appearance of the layered product is controlled by means of phase viscosity. Where random layering is desired, the viscosity difference between the phases is minimized and usually maintained at less than 10, preferably less than five, Brookfield units (Model HAT with helipath and T-B spindle at 2.5 r.p.m. Where a uniform appearance approaching that of the stripes of the United States flag is desired, the white phase viscosity is controlled such that it is 10, and preferably 20 Brookfield units greater than the red phase viscosity. Maintaining the white phase viscosity greater than the red phase viscosity while providing uniform layering, also prevents separation of the phases after heat coagulation or during frying.

The pH of the initial soy isolate used in the red phase is controlled so that the finished red phase emulsion's pH is below 6, generally ranging from 5.1 to 5.9 and having a mean pH of about 5.5. The white phase pH (albumen only) is also about pH 6, preferably 5.8 to 6.2. Where soy isolate is present, pH is naturally adjusted to maintain this pH.

The viscosity of each phase is normally maintained at 2-55, more particularly 5-15 Brookfield units, Model HAT, spindle T-B at 2.5 r.p.m.

It is desirable, from a cost and nutrition standpoint, to employ proteinaceous fillers where possible. We have found that any substntially non-coagulable protein material may be employed to increase protein content, decrease cost, and possibly provide some discontinuity of the gelled phase. Among the proteinaceous fillers that may be employed are animal proteins and particularly vegetable proteins, such as oil seed proteins (especially defatted oil seed meals such as soy), grains, vegetable protein fibers, texturized vegetable proteins, and the like. Typical of U.S. patents teaching such texturized protein are the patents to Atkinson, No. 3,480,442 and No. 3,488,770; Calvert, No. 3,498,794; Hamdy, No. 3,537,859; MacAllister, No. 3,102,031; McAnelly, No. 3,142,571; Kjelson, No. 3,197,310; and Wenger, No. 3,385,709. Many of the patents discussed in the prior art teach methods of preparing other protein materials including protein isolate fibers which are useful as fillers.

Whatever the source of proteinaceous filler, it is preferable that the protein material be ground to a size which is not visually apparent to the consumer once incorporated in our meat-like analog. We have found that if the filler is ground such that 90% of the material passes through a 45 mesh U.S. Standard Sieve and such that at least 80% passes through a 50 mesh U.S. Standard Sieve, that when incorporated in the emulsion and heat-coagulated therein, the proteinaceous filler particles are not visually apparent in either the unfried or fried meat analog. Surprisingly, we have found that more ground proteinaceous filler can be employed in the fatty phase. This finding is unusual since the prior art would suggest that proteinaceous fillers such as fibers would be employed to more closely simulate the texture of a lean phase of the analog. However, in such cases the fibers are normally of visual length and are used principally to develop the lean texture desired in the red phase.

To prepare proteinaceous fillers for use in our analog, texturized vegetable protein or other suitable filler is conventionally ground in a Fitzpatrick mill employing a ¼″ or ⅜″ screen, and then re-ground in an Alpine mill at a large to large setting. The exact method of grinding the filler is not critical nor is the type of filler. Furthermore, experiments indicate the texture of the finished meat analog is better when a broad range of fine particle sizes is employed rather than any narrow range of particle size—for example, those passing a U.S. 50 but retained on a U.S. 60 screen.

A distinct advantage of the present invention is the ability to control the texture and mouthfeel of the multilayered meat analog without resort to protein fibers, thus allowing the production of analogs at lower cost. A further advantage is that any substantially non-coagulable vegetable and meat protein material which is finely ground and does not contribute a noticeable taste can be employed. For our purposes, we have found finely ground extruded vegetable proteins to provide an inexpensive source of proteinaceous filler.

The proportions of ingredients set forth for the red and white phases of this invention are necessary for obtaining the correct textural properties of the final product. These proportions include colors and flavoring agents necessary for flavor and appearance. In our analog, 5 to 15% by weight of each phase consists of colors and flavoring agents. Selection of the type of flavoring agents employed is considered routine to one of ordinary skill in the art. Of course, the selection is important to render the bacon analog as close as possible in flavor to the natural fried product. Flavoring agents can include sugar, salt, peper, HVP's, autolyzed yeast, MSG, nucleotides, imitation and natural flavors, imitation and natural aromas, flavor enhancers, and the like.

A typical bacon formulation is given in the following table:

TABLE III

|  | Red (meat) phase, 40% of total | White (fat) phase, 60% of total | Total beacon analog |
|---|---|---|---|
| Fat | 16.6 | 38.9 | 30.0 |
| Proteinaceous filler | 4.4 | 8.6 | 6.9 |
| Soy isolate | 13.5 | None | 5.4 |
| Albumen | 4.3 | 12.7 | 9.3 |
| Color and flavoring agents | 7.3 | 10.1 | 9.0 |
| Water | 53.9 | 29.7 | 39.4 |
| Total | 100.0 | 100.0 | 100.0 |

As a fat source for the white phase, we prefer to employ a hydrogenated blend of soybean and cottonseed oil which has been fractionated and is sold under the commercial name Durkex 500. For the red phase, we prefer soybean oil (Crisco Oil) when using spray dried isolate. However, usually with slight modification, it is possible to use other fats and oils with equally good results. We have found that the addition of a small amount of soy isolate to the white phase (less than 5% of total white phase ingredients), aids incorporation of the oil into the emulsion and provides slight textural changes when changing from Durkex 500. In no instance will the amount of isolate employed in the white phase equal or exceed the amount employed in the red phase. On a percentage basis, the white phase will contain at least twice as much fat as the red phase. Fats contemplated for use in either phase of the product of this invention would include hydrogenated, partially hydrogenated, and unhydrogenated vegetable oils such as safflower oil, corn oil, soybean oil, cottonseed oil, and the like; as well as animal derived fats such as fish oil, lard, etc. and mixtures thereof.

The ratio of red to white phase is not critical. Where a product is desired to resemble conventional bacon, the ratio is generally 40% red to 60% white. However, to improve the lean appearance of the bacon, it may be 60% red and 40% white. In actuality, any visually desirable combination of red and white phase may be employed and would depend upon the type of meat being simulated. For example, when simulating ham, the proportions might be 90% red and 10% white.

Once red and white emulsions have been prepared, the red and white phases are alternately layered in a suitable container to form a loaf of distinct layers of red and white emulsion to simulate the stratification of bacon. The loaf is then heat treated—preferably in an autoclave, refrigerated, sliced, and either fried or packaged directly. Layers beginning with the white phase are spread employing a spatula or other suitable device in a container such as a 2" x 6" x 10" Teflon coated pan. The pan is lightly coated with edible oil prior to layering to insure that after heat treatment the loaf is easily removed from the container. The white phase is first spread followed by a light red phase, followed by a white layer, followed by a dark red layer, followed by a white layer, and ending with a dark red layer. The dark red layer is prepared by simply taking the light red phase and adding more color to develop a darker red in the product. The total weight of the loaf is about 1 kg. The loaf pan is covered by a loose-fitting cover, placed in an autoclave, and heated until the internal temperature of the product is raised to at least above 200° F., and preferably to above 250° F.

The heat-treated loaf is then slowly brought to atmospheric pressure. This is believed necessary to prevent steam and gas trapped in the loaf from being rapidly depressurized, resulting in tearing and splitting of the loaf. While the loaf can be cut at ambient temperatures, it is preferred to cool the loaf to below 50° F. The loaf is then sliced by any known technique to produce strips approximately 1¼" in width, 6" in length, and about 1/16" in thickness. For home consumption, the uncooked product is placed on a paper backer, vacuum sealed in plastic pouches similar to the method used for some quality processed meats.

Alternatively, half-products can be prepared to allow either home frying or oven baking to a crisp texture. The pre-cooked, half-products should have a moisture content above 10%. Below 10% moisture, the product is brittle and is difficult to package and ship in strip form without appreciable breakage. However, the thoroughly cooked product is highly useful as bacon bits for salads and the like.

The sliced strips are partially or completely cooked by direct exposure to radiant heat such as broiling, microwave cooking or the like; or direct heat by pan frying or oil bath cooking or by other art recognized techniques employed to brown meat.

To prepare by pan frying, it is preferred to add oil to the frying pan and that the bacon analog be fried in the normal manner. Addition of oil prevents burning of the product and allows a portion of the oil to be absorbed by the bacon product. Frying in oil also insures a large amount of crinkling typical of conventional bacon and insures a proper browning of the product.

Half-products are prepared by deep fat frying slices of the analog in Crisco or other suitable oil for one minute at 250° F. to a moisture content of about 13.5%. Alternatively, slices of the analog are coated with oil and cooked in a microwave or infrared oven. These half-products are finally cooked by the consumer by baking for example, in a 350° F. oven for 3–9 minutes or by pan frying to desired crispness.

Other meat analogs can be prepared such as sliced ham. For example, the red and white phases are prepared as previously indicated. A one-inch layer of red phase is placed in a Teflon-coated pan. To this is added white phase at about 10% by weight of the final mixture. The white phase is extruded into the red phase in a random manner. The mixture is autoclaved, removed from the pan and sliced into ⅛" slices, slicing parallel to the top surface.

A series of preparations of the bacon analog were made, the analog having the following composition:

FORMULATION

|  | Red phase | White phase |
|---|---|---|
| Water (distilled) | 154 | 239 |
| Dry egg albumen | 29.8 | 102.3 |
| Dry, ground proteinaceous filler | 30 | 69 |
| Soy isolate—adjusted to 70% H₂O, pH 6.0 to 6.4 | 306 | None |
| Fat—Durkex 500 | 91 | 273 |
| Bacon and maple flavor | 22.8 | 40 |
| Dry spice mix | 50.9 | 80.6 |
| Red color | 1.8 | None |
| Total | 686.3 | 803.9 |

Preparation of Red Phase

One lb. of soy isolate curd, approximately 40% solids (pH 4.8 to 5.2) was blended in a 5 qt. Hobart mixer for 5 minutes at speed 1. The pH and moisture content were monitored, and sufficient water and 1N sodium hydroxide were combined to adjust the isolate suspension's pH to 6.0 to 6.4, and the suspension water content to 70% water, as is basis. The suspension was mixed 10 minutes at speed 2 and a further check of moisture and pH made with adjustment made, if necessary.

To 306 gm. of the adjusted isolate in a 5 qt. Hobart mixer were added 154 gm. of water and 30 gm. of finely ground texturized vegetable protein, and the entire mixture blended for 10 minutes at speed 2. Dry spice mix, dry egg albumen, color solution, and maple flavor were next added and again blended 10 minutes at speed 2. To the uniform blend was added 91 gm. of fat, the fat previously blended with the bacon flavor. The entire mixture was blended 15 minutes at speed 2 until an emulsion of oil and water was formed which was stable for at least several hours. The emulsion density (75° F.) ranged from 0.91 to 0.97 g./cc., with a mean of 0.94; the pH was 5.5 plus or minus 0.4 and the viscosity was 8.0–15.5 with a mean of 12.0 Brookfield units Model HAT with helipath, spindle T–B at 2.5 r.p.m.

Preparation of the White Phase

As in the red phase, 239 gm. of water and 69 gm. of finely ground proteinaceous vegetable filler were combined in a 5 qt. Hobart mixer and mixed 10 minutes at speed 2. On producing a uniform batch, the dry spice mix, dry egg albumen, and maple flavor were added, and mixing continued for 10 minutes at speed 2. Finally, 273 gm. of fat containing bacon flavor was added to the aqueous suspension, and mixed 15 minutes at speed 2. Mixing was continued sufficiently long to produce an emulsion at 76° F. having a density of 0.83 to about 0.90, with a mean of 0.87; a mean pH of 5.99 and a viscosity of 6.0–11.5 with a mean of 8.9 Brookfield unit at 2.5 r.p.m.

Preparation of the Vegetable Protein Filler

A major proportion of wheat gluten was mixed with ground, defatted soy grits, wheat flour, salt, and ammonium carbonate. The mixture was fed to a Wenger X25 extruder at 360 lbs./hr. where it was mixed with 120 lbs./hr. of water and extruded such that on issuing from the extruder, the temperature of the extrudate was between 325° to 370° F. To obtain these temperatures, steam was employed to heat the extruder jacket and two ⅜" die openings were employed. The extrudate was then air dried and ground in a Fitz mill followed by an Alpine mill to a particle size where 90% was below a 45 U.S. Standard Sieve.

A typical sieve analysis of protein filler is found below:

| Sieve No. (U.S.) | Percent on Sieve |
|---|---|
| 45 | 3.45 |
| 50 | 7.35 |
| 60 | 43.80 |
| 80 | 6.90 |
| 100 | 19.55 |
| Pan | 17.80 |
| Total | 98.85 |

Layering the Emulsified Phases

To a Teflon coated pan 10" x 6" x 2" was added, in the following order and proportions, the emulsified materials: A white portion, 199 gm. was first placed in the pan employing a spatula. On top of this layer was placed a first red portion of 176 gm., followed by a white portion of 176 gm. The remainder of the red portion was blended with further red color to produce a darker emulsion, and this darker emulsion was next added at 100 gm. A white phase of 225 gm. was then spread over the red phase, and finally a last dark red phase of 135 gm. was layered. The layered product was then ready for heat coagulation.

Heat Coagulation

The Teflon coated pan was lightly covered and placed in an autoclave manufactured by Castle Sterilizer. Steam was introduced slowly over a 10-minute period to raise the temperature of the loaf to 170 to 210° F. and purge the autoclave. The pressure was next increased to 20 p.s.i.g. over a 5-minute period, and then held at 20 p.s.i.g. for 20 minutes. The steam was then shut off, and air under back pressure was admitted and the loaf maintained under the 20 p.s.i.g. for 15 minutes. The pressure was then reduced to 15 p.s.i.g. and held there for 5 minutes, followed by a reduction to 10 p.s.i.g. for 3 minutes and finally reduced to atmospheric pressure. The coagulated loaf was removed from the autoclave and refrigerated. The finished loaf, 1¼" x 5⅞" x 9¾" was sliced into about 1/16" thick slices using a conventional meat slicer. While this could be done at ambient temperatures, we prefer to slice the bacon analog at a temperature below 50° F.

Preparation of the Slices

To a 10" electric frying pan was added 25 ml. of Crisco Oil, and the temperature adjusted to 340° F. Six to eight slices of the bacon analog were added and turned every two minutes until the desired degree of cook was reached. The slices were generally cooked 6 to 12 minutes until crinkled, brown, and of the desired degree of crispness. During frying, the slices incorporate some of the fat added to the pan.

Half-products were prepared by frying slices (deep fat), at 250° F. (225°–350° F. suitable) for one minute to a moisture content of 13–14%. Alternatively, 10 slices were coated with oil, stacked and cooked 2–3 minutes in an Amana radar range.

EXAMPLES II–IV

The general procedure given in Example I was repeated. Crisco oil was substituted for the Durkex 500 in the red phase, spray dried soy isolate (pH 6.2) was substituted for frozen isolate and a gum was employed in III and IV to regulate viscosity. The white phase ingredients and their proportions remained the same; the red phase ingredients and their proportions are given below:

| Example number | II | III | IV |
|---|---|---|---|
| Formulation: | | | |
| Water | 333.2 | 363.4 | 363.4 |
| Albumen | 44.2 | 30.3 | 30.3 |
| Filler | 30.3 | 27.8 | None |
| Spray-dried isolate | 82.7 | 68.8 | 96.6 |
| Crisco oil | 121.2 | 121.2 | 121.2 |
| Bacon and maple flavor | 22.5 | 22.5 | 22.5 |
| Dry spice mix | 51.0 | 51.0 | 51.0 |
| Red color | 1.8 | 1.8 | 1.8 |
| CMC | None | 5.0 | 4.5 |
| Total | 686.9 | 691.8 | 691.3 |

The preparation of the red phase of Example I was modified by slowly adding the spray dried soy isolate to water in a five-quart Hobart mixer, stirred at speed 1. After all the isolate was added, mixing was continued for 5–10 minutes at speed 1. Finally, ground vegetable protein filler was then added to the mixture, blended 10 minutes at speed 2. The addition of other ingredients and processing thereof was continued as in Example II. The final Example II product was more bi-textural in nature with the products of Examples III and IV similar to the product of Example I.

What is claimed is:

1. A meat analog containing a plurality of distinct regions comprising: at least one reigon containing 20–39 parts water, 30–50 parts fat, 7–20 parts albumen, 0–5 parts protein isolate, 0–20 parts proteinaceous filler particles and up to 15 parts flavoring agents and at least one region containing 40–65 parts water, 10–25 parts fat, up to 15 parts albumen, 6–24 parts protein isolate, 0–15 parts proteinaceous filler particles, and up to 15 parts flavoring agents; said regions, when cooked, texturally resembling the fatty and lean regions of cooked meat; the albumen content of the first mentioned region being higher than the albumen content of the second mentioned region and the total number of parts of water, fat, albumen, protein isolate, proteinaceous filler and flavoring agents in each region being 100 parts.

2. A bacon-like product of Claim 1 which crinkles on cooking, wherein the fatty first mentioned region contains 25–35 parts water, 5–15 parts vegetable proteinaceous filler, 35–45 parts fat, 0–4 parts soy protein isolate, up to 15 parts flavoring agents, and 9–10 parts egg albumen.

3. A bacon-like product of Claim 1 which crinkles on cooking in which the second mentioned region contains 45–60 parts water, 1–10 parts vegetable proteinaceous filler, 9–18 parts soy protein isolate, 15–25 parts fat, up to 15 parts flavoring agents, 0–1 parts thickening agents, and about 1–8 parts egg albumen.

4. The product of Claim 2 wherein the second mentioned region contains 45–60 parts water, 1–10 parts vegetable proteinaceous filler, 9–18 parts soy protein isolate, 15–25 parts fat, up to 15 parts flavoring agents, 0–1 parts thickening agents, and about 1–8 parts egg albumen.

5. The product of Claim 1 in which the analog is at least partially cooked.

6. A process for preparing a meat analog comprising:
(a) preparing at least two distinct mixtures, each containing water, fat, and heat coagulable protein;
(b) one of said mixtures containing 20–39 parts water, 30–50 parts fat, 7–20 parts albumen, 0–5 parts protein isolate, 0–20 parts proteinaceous filler and up to 15 parts flavoring agents which mixture, when cooked, texturally resembles fatty phase of fried meat;
(c) the other mixture containing 40–65 parts water, 10–25 parts fat, up to 15 parts albumen, 6–24 parts protein isolate, 0–15 parts proteinaceous filler particles and up to 15 parts flavoring agents which mixture, when cooked, texturally resembles the lean phase of fried meat;
(d) applying one of the mixtures to a surface to form a layer;
(e) applying the other mixture to the surface of the applied layer to form a layered mass of at least two distinct mixtures;
(f) Heating the layered mass to coagulate the heat coagulable protein; the albumen content in the first mentioned mixture being higher than the albumen content in the second mentioned mixture and the total number of parts of water, fat, albumen, protein isolate, proteinaceous filler and flavoring agents in each mixture being 100 parts.

7. The process of Claim 6 in which the heat set emulsion is sliced into strips which when cooked have the appearance of fried bacon.

8. The process of Claim 7 in which the sliced strips are at least partially cooked.

References Cited
UNITED STATES PATENTS

| 3,320,070 | 5/1967 | Hartman | 99—17 |
|---|---|---|---|
| 3,537,859 | 11/1970 | Hamdy | 99—17 |

JAMES R. HOFFMAN, Primary Examiner

U.S. Cl. X.R.

426—104, 249, 802

UNITED STATES PATENT OFFICE
CERTIFICATE OF CORRECTION

Patent No. 3,840,677  Dated October 8, 1974

Inventor(s) Harold T. Leidy, et al.

It is certified that error appears in the above-identified patent and that said Letters Patent are hereby corrected as shown below:

Column 1, line 23, before "products" and after "to" change --meat like-- to --meat-like--.

Column 1, line 28, before "efforts" and after "and" change --devolopment-- to --development--.

Column 1, line 52, before "spun" and after "to" change --prepare-- to --preparing--.

Column 2, line 10, before "Sair." change --155;-- to --159;--.

Column 2, line 35 after "as" change --"Sipples."-- to --"Stripples."--

Column 2, line 45, before "portion" and after "fatty" insert --fried--.

Column 5, line 2, before "resem-" and after "fibrous" change --chewness-- to --chewiness--.

Column 6, line 21, before "non-coagulable" and after "any" change --substntially-- to --substantially--.

Column 7, line 12, before "HVP's," and after "salt," change --peper,-- to --pepper,--.

Column 10, line 66, before "containing" and after "one" change --reigon-- to --region--.

Column 11, line 9, before "parts" and after "and" change --9-10-- to --9-18--.

Column 11, line 20, before "thickening" change --parts-- to --part--.

Signed and sealed this 11th day of March 1975.

(SEAL)
Attest:

RUTH C. MASON
Attesting Officer

C. MARSHALL DANN
Commissioner of Patents
and Trademarks